US010519004B2

(12) United States Patent
Nishida

(10) Patent No.: US 10,519,004 B2
(45) Date of Patent: Dec. 31, 2019

(54) ELEVATOR SYSTEM

(71) Applicant: Mitsubishi Electric Corporation, Chiyoda-ku (JP)

(72) Inventor: Chiaki Nishida, Chiyoda-ku (JP)

(73) Assignee: Mitsubishi Electric Corporation, Chiyoda-ku, Tokyo (JP)

( * ) Notice: Subject to any disclaimer, the term of this patent is extended or adjusted under 35 U.S.C. 154(b) by 277 days.

(21) Appl. No.: 15/523,791

(22) PCT Filed: Nov. 21, 2014

(86) PCT No.: PCT/JP2014/005851

§ 371 (c)(1),
(2) Date: May 2, 2017

(87) PCT Pub. No.: WO2016/079772

PCT Pub. Date: May 26, 2016

(65) Prior Publication Data

US 2017/0320705 A1 Nov. 9, 2017

(51) Int. Cl.
*G05B 15/00* (2006.01)
*B66B 5/02* (2006.01)
(Continued)

(52) U.S. Cl.
CPC ................ *B66B 5/021* (2013.01); *B66B 1/28* (2013.01); *B66B 1/3407* (2013.01)

(58) Field of Classification Search
CPC .......... B66B 5/021; B66B 5/024; B66B 1/28; B66B 1/3407
(Continued)

(56) References Cited

U.S. PATENT DOCUMENTS

2005/0173199 A1* 8/2005 Kawai ..................... B66B 5/024 187/313
2010/0224451 A1* 9/2010 Hikita ..................... B66B 5/024 187/247
(Continued)

FOREIGN PATENT DOCUMENTS

EP 2 727 874 A1 5/2014
JP 56-37976 A 4/1981
(Continued)

OTHER PUBLICATIONS

International Search Report dated Feb. 17, 2015 in PCT/JP2014/005851, filed Nov. 21, 2014.

*Primary Examiner* — Jeffrey Donels
(74) *Attorney, Agent, or Firm* — Xsensus LLP

(57) ABSTRACT

An elevator system includes: key switches, provided at a hall, used in an evacuation operation to select either a shuttle operation request mode requesting a car to shuttle between an evacuation floor and a rescue floor, or an evacuation completion mode indicating completion of evacuation; a first notification mechanism provided in the car; and an elevator controller switching between normal operation and the evacuation operation, determining, in a case at least one of the key switches is switched to the evacuation operation, that a floor at a hall whose key switch is in the shuttle operation mode is a rescue floor and a floor at a hall whose key switch is in the evacuation completion mode is an evacuation completion floor, and making, in a case a hall button provided at the hall of the evacuation completion floor is operated, the first notification mechanism notify of the evacuation completion floor.

20 Claims, 9 Drawing Sheets

(51) Int. Cl.
*B66B 1/28* (2006.01)
*B66B 1/34* (2006.01)

(58) Field of Classification Search
USPC .......................................................... 187/247
See application file for complete search history.

(56) References Cited

U.S. PATENT DOCUMENTS

| | | | | |
|---|---|---|---|---|
| 2011/0155516 | A1* | 6/2011 | Mason | B66B 5/024 187/384 |
| 2016/0280510 | A1* | 9/2016 | Koba | B66B 5/021 |
| 2018/0093859 | A1* | 4/2018 | Stranieri | B66B 1/2408 |
| 2019/0012887 | A1* | 1/2019 | Troesch | B66B 5/021 |

FOREIGN PATENT DOCUMENTS

| | | | |
|---|---|---|---|
| JP | 6-211455 | A | 8/1994 |
| JP | 2005-112601 | A | 4/2005 |
| JP | 2013-154978 | A | 8/2013 |
| JP | 2013-180880 | A | 9/2013 |
| WO | 2013/001643 | A1 | 1/2013 |

* cited by examiner

ELEVATOR SYSTEM

TECHNICAL FIELD

The present invention relates to an elevator system to assist evacuation in emergency evacuation.

BACKGROUND ART

In a case of an emergency such as fire of a building, a conventional elevator system switches from a normal operation to an evacuation operation. When the elevator system switches to the evacuation operation, an evacuation guide operates a key switch provided at a hall of a rescue floor and in a car. When a key switch provided at the hall of the rescue floor is operated by the evacuation guide to issue a car shuttle operation mode request, an elevator controller makes the car perform a shuttle operation between the hall and an evacuation floor determined in advance (For example, Patent Document 1).

PRIOR ART DOCUMENT

Patent Document

Patent Document 1: International Publication No. 2013/001643 (page 4, FIG. 2)

SUMMARY OF THE INVENTION

Problem to be Solved by the Invention

However, in the elevator system described in Patent Document 1, in an evacuation operation, a hall call can be registered only when a key carried by an evacuation guide is used to operate the key switch. Therefore, in a case where the evacuation guide completes a rescue operation at a rescue floor and cancels a car shuttle operation mode to leave the rescue floor and then an evacuee arrives late at the hall of the rescue floor, the evacuee cannot register a hall call.

The present invention is made to solve the problem described above and to provide an elevator system that validates a hall call registration operation from the hall even after the evacuation guide determines that evacuation is completed, and cancels the car shuttle operation mode to leave the hall.

An elevator system according to the present invention includes key switches each provided at a hall and used in an evacuation operation to select either one of a shuttle operation request mode for requesting a car to shuttle between an evacuation floor and a rescue floor, or an evacuation completion mode for indicating completion of evacuation; a first notification means provided in the car; and an elevator controller which is capable of switching between a normal operation and the evacuation operation, the elevator controller determining, in a case when at least one of the key switches is switched to the evacuation operation, that a floor at a hall whose key switch is in the shuttle operation mode is a rescue floor and a floor at a hall whose key switch is in the evacuation completion mode is an evacuation completion floor, and when a hall button provided at the hall of the evacuation completion floor is operated, the elevator controller making the first notification means notify of the evacuation completion floor.

Effect of the Invention

According to the present invention, in an evacuation operation, even after an evacuation guide cancels a car shuttle operation mode to leave a hall, the hall call registration operation from the hall by an evacuee arriving late can be validated. Also, because in a car, notification is made of an evacuation completion floor from which an evacuee has performed a hall call registration operation, an evacuation guide in the car can recognize the hall where an evacuee having failed to escape still remains.

MODES FOR CARRYING OUT THE INVENTION

Embodiment 1

Figure 1:
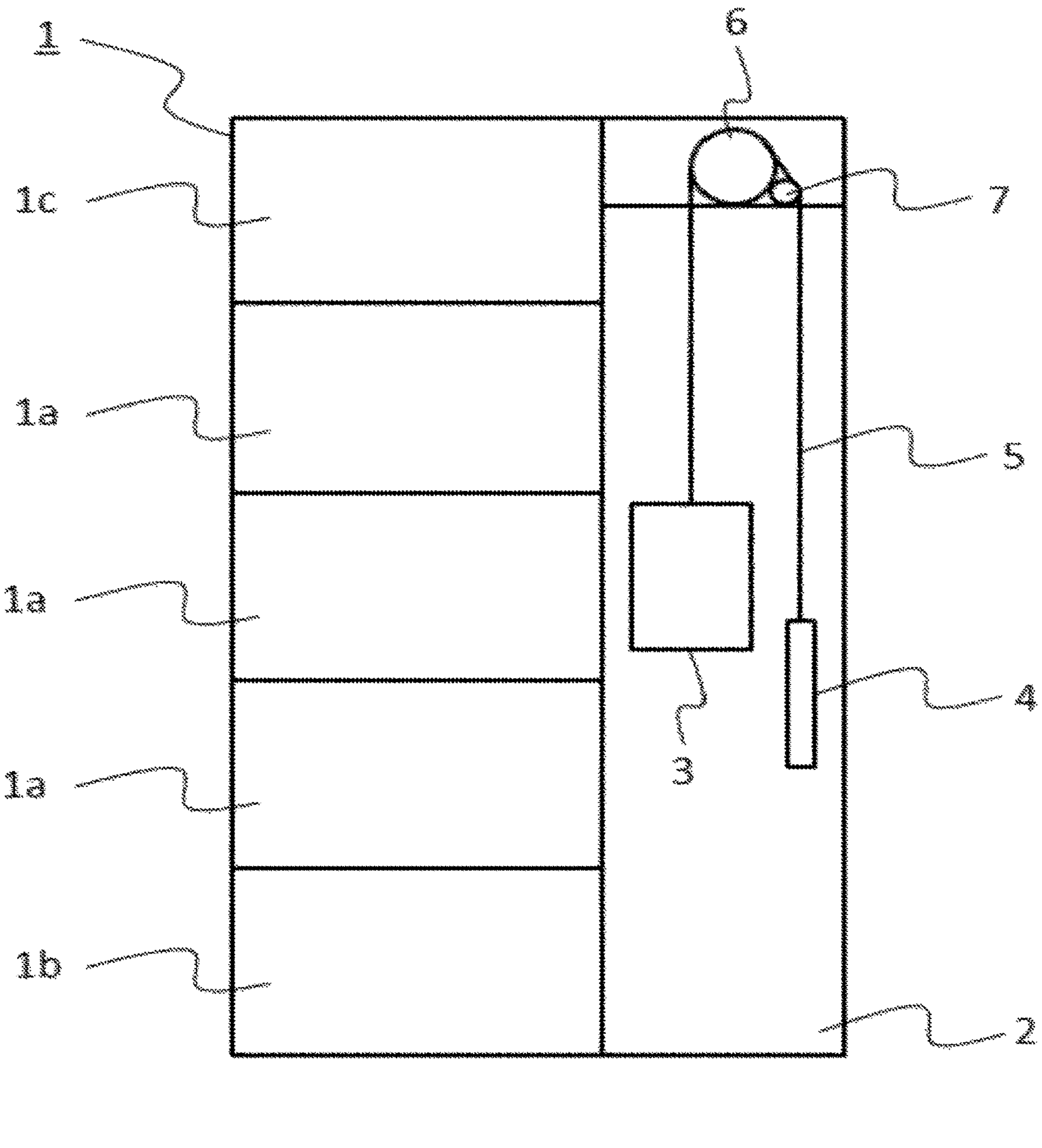
FIG. 1 is a schematic diagram of a building equipped with an elevator system according to Embodiment 1 of the present invention.

FIG. 1 is a schematic diagram of a building 1 equipped with an elevator system according to Embodiment 1 of the present invention. The building 1 is provided with a hoistway 2 penetrating each floor. In the hoistway 2, a car 3 and a counterweight 4 are suspended by a rope 5. The rope 5 is wound around a hoisting machine 6 and a deflector wheel 7. When the hoisting machine 6 is rotary-driven, the car 3 and the counterweight 4 travel up and down as the rope 5 moves. FIG. 1 illustrates that there are three rescue floors 1*a*, a single evacuation floor 1*b* and a single evacuation completion floor 1*c* in the building 1. The rescue floors 1*a* are the floors where evacuation guides are rescuing evacuees. The evacuation floor 1*b*, set for example to an entrance floor, is a floor from which evacuees evacuated from the rescue floors 1*a* are to evacuate out of the building 1. The evacuation completion floor 1*c* is a floor which an evacuation guide has determined that all evacuees have been rescued from.

Figure 2:
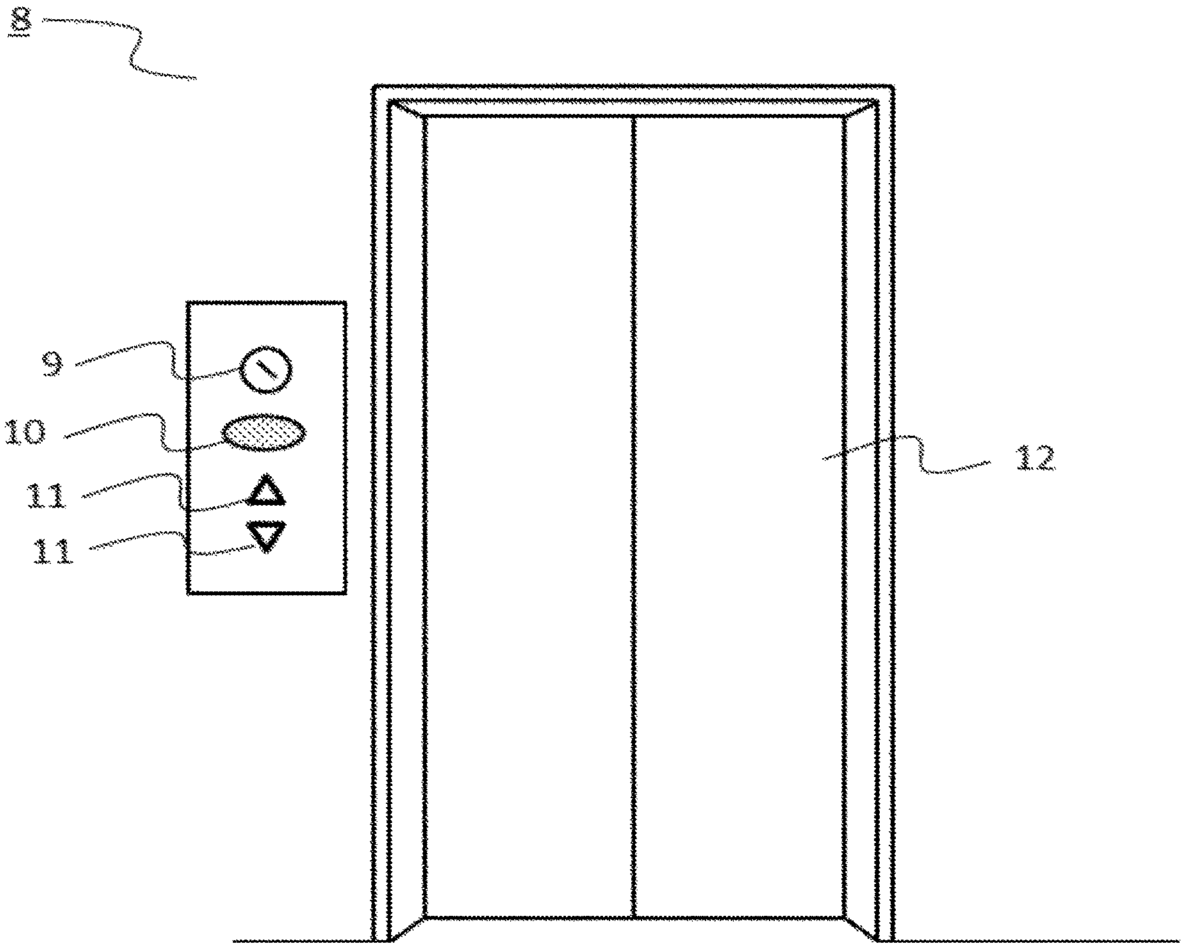
FIG. 2 is a schematic diagram illustrating a hall of each of a rescue floor and an evacuation completion floor according to Embodiment 1 of the present invention.

FIG. 2 is a schematic diagram illustrating a hall 8 of each of the rescue floors 1*a* and the evacuation completion floor 1*c* according to Embodiment 1 of the present invention. The hall 8 is provided with a key switch 9, a speaker microphone 10, hall buttons 11, and a hall door 12. In an evacuation operation, an evacuation guide turns a key (not illustrated) with the key inserted in the key switch 9 to command a shuttle operation of the car 3. The speaker microphone 10 is a second notification means. Note that at the hall 8 of the evacuation floor 1*b*, the key switch 9 is not provided, hut other components are the same as those of the rescue floor 1*a* and the evacuation completion floor 1*c*.

Figure 3:
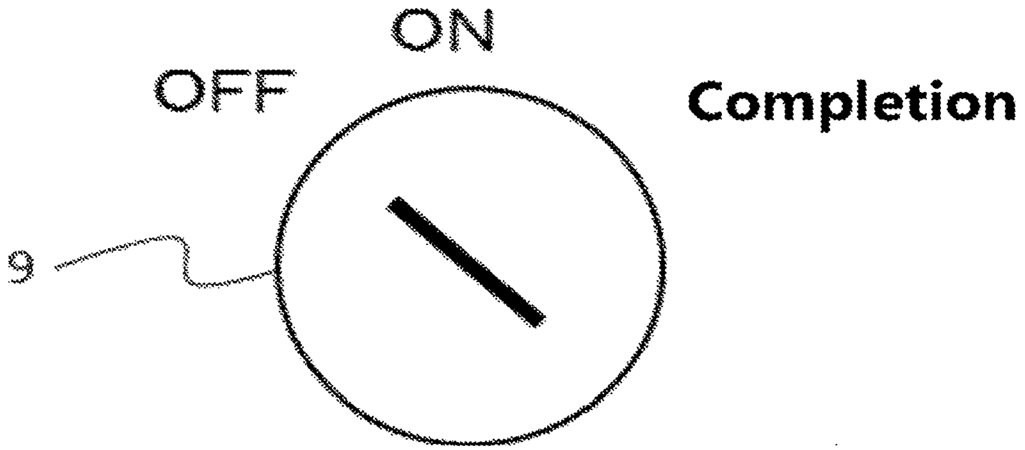
FIG. 3 is a front view of a key switch according to Embodiment 1 of the present invention.

FIG. 3 is a front view of the key switch 9 according to Embodiment 1 of the present invention. The key switch 9 is a three position type. The evacuation guide turns a key (not illustrated) carried by the evacuation guide with the key inserted in the key switch 9 to select either "ON" indicating a shuttle operation request mode, "OFF" indicating a shuttle operation cancellation mode, or "Completion" indicating an evacuation completion mode. The key switch 9 outputs a control signal corresponding to the selected mode to an elevator controller 19. When "ON" is selected with the key switch 9, the elevator controller 19 determines that this floor is a rescue floor 1*a*, makes the car 3 perform a shuttle operation between this rescue floor 1*a* and the evacuation floor 1*b*, and invalidates a hall call registration registered by a press of the hall button 11 provided at the hall 8. When "OFF" is selected with the key switch 9, the elevator controller 19 excludes this floor from the coverage of the shuttle operation of the car 3, and invalidates a hall call registration registered by a press of the hall button 11 provided in this hall 8. When "Completion" is selected with the key switch 9, the elevator controller 19 determines that this floor is an evacuation completion floor 1*c*, excludes the floor from the coverage of the shuttle operation of the car 3, and validates a hall call registration registered by a press of the hall button 11 provided in this hall 8. The marks on the key switch 9 here are shown as "ON", "OFF" and "Completion". But they are not limited to these. "SELECT", "CANCEL" and "Completion" for example may be used.

Figure 4:
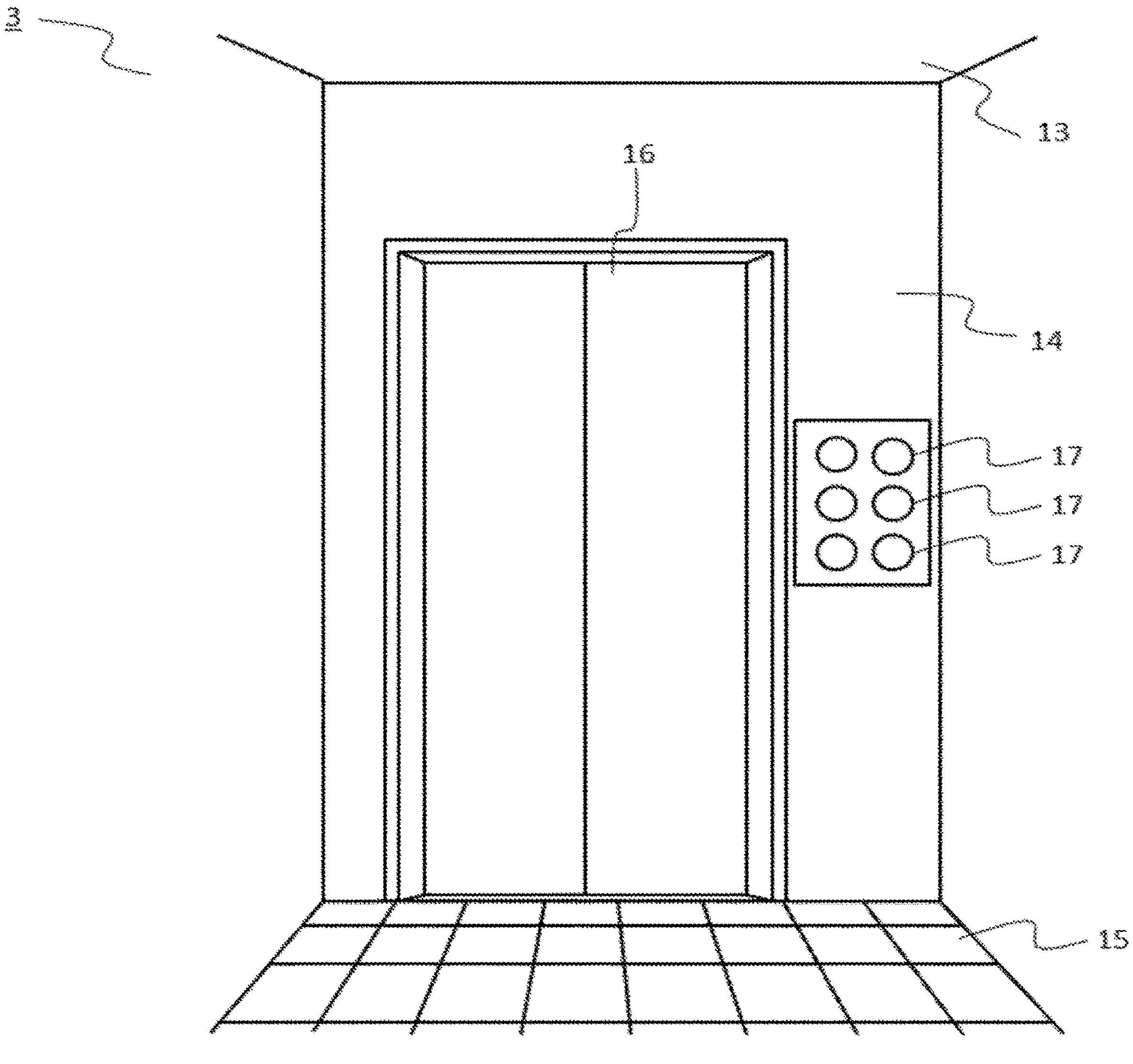
FIG. 4 is a schematic diagram illustrating the inside of a car according to Embodiment 1 of the present invention.

FIG. 4 is a schematic diagram illustrating the inside of the car 3 according to Embodiment 1 of the present invention. The car 3 includes a ceiling 13, a car wall 14, and a car floor 15 and is provided with a car door 16 and destination floor registration buttons 17.

Figure 5:
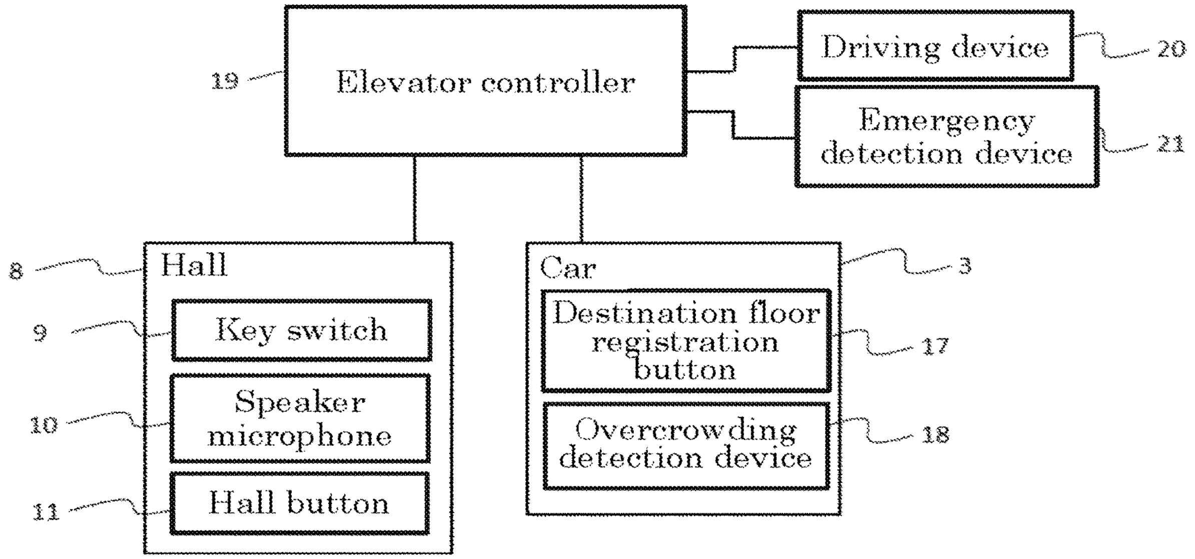
FIG. 5 is a functional block diagram of the elevator system according to Embodiment 1 of the present invention.

FIG. 5 is a functional block diagram of the elevator system according to Embodiment 1 of the present invention. The elevator controller 19 is connected to a driving device 20; an emergency detection device 21; the car 3; the destination floor registration buttons 17 and an overcrowding detection device 18 which are provided in the car 3; the hall 8; and a key switch 9, a speaker microphone 10, and hall buttons 11 which are provided at the hall 8. The elevator controller 19 switches between a normal operation and an evacuation operation, and controls operation of the elevator in each operation mode. The driving device 20 drives the hoisting machine 6 for rotation, so that the hoisting machine makes the car 3 and the counterweight 4 travel up and down in the hoistway 2. The emergency detection device 21 is a device to detect an emergency such as a fire. When the emergency detection device 21 detects an emergency, the elevator controller 19 switches from the normal operation to the evacuation operation. The overcrowding detection device 18 detects the loading weight in the car 3 to determine whether the car 3 is full. It has been explained that the overcrowding detection device 18 detects the loading weight in the car 3. But its configuration is not limited to this. A configuration, for example, may be adopted in which a camera is set in the car 3 to determine whether the car 3 is full from images taken by the camera.

Figure 6:
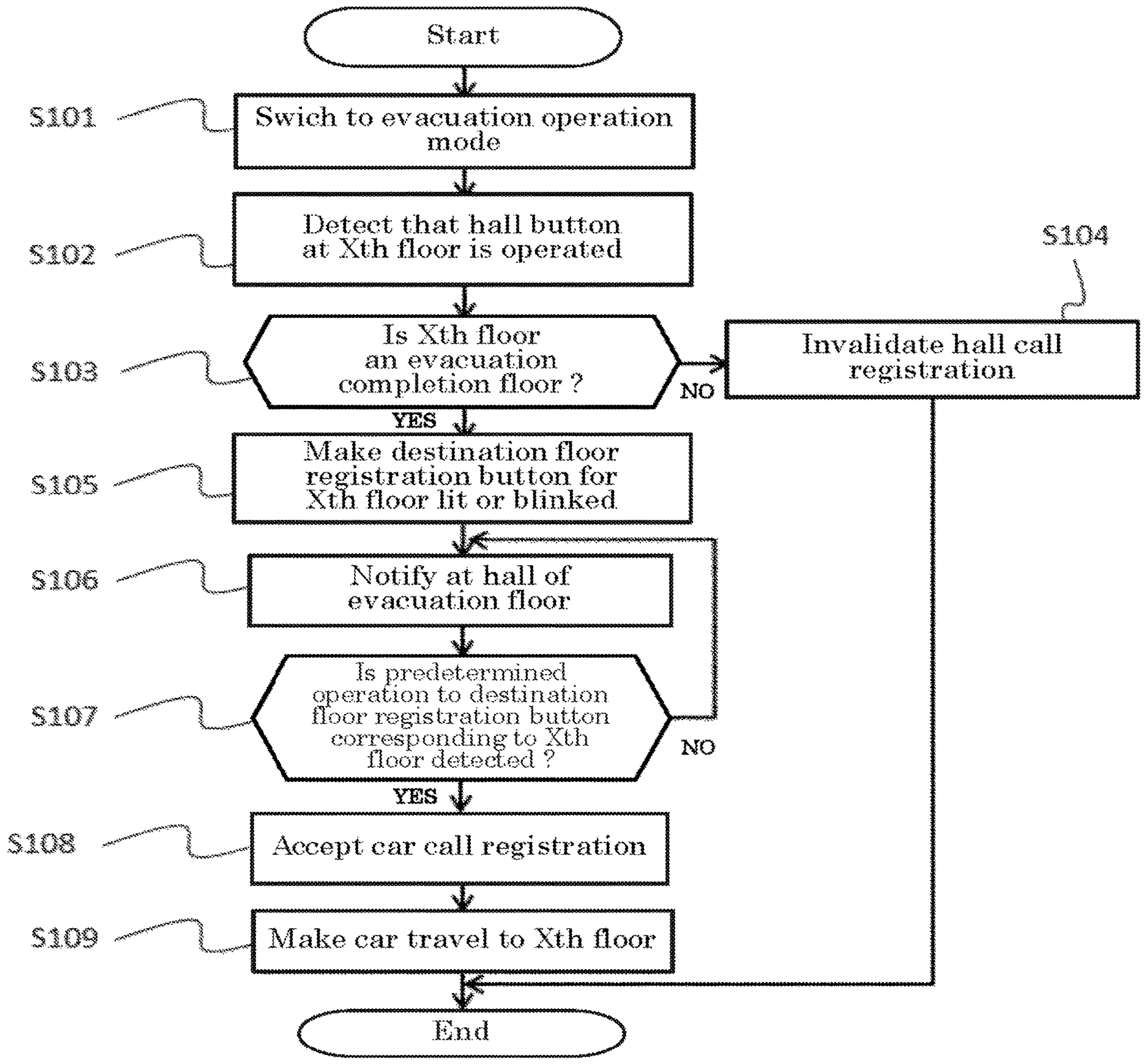
FIG. 6 is a flowchart illustrating how an elevator controller operates in an evacuation operation.

Next, with reference to FIG. 6, the evacuation operation of the elevator controller 19 will be explained. FIG. 6 is a flowchart illustrating how the elevator controller 19 operates in the evacuation operation. When the emergency detection device 21 detects an emergency such as a fire, the elevator controller 19 switches from a normal operation mode to an evacuation operation mode in Step (Hereinafter referred to as S) 101. The evacuation guide turns a key to select "ON" with the key inserted in the key switch 9 of the rescue floor 1*a* where evacuees remain. The elevator controller 19 makes the car 3 perform a shuttle operation between the rescue floor 1*a* at which ON is selected with the key switch 9 and the evacuation floor 1*b*. The evacuation guide evacuates the evacuees remaining in the rescue floor 1*a* to the evacuation floor 1*b* by the shuttle operation of the car 3. When the evacuation guide has evacuated all the evacuees from the hall 8 of the rescue floor 1*a* to the evacuation floor 1*b*, the evacuation guide determines that evacuation is completed and turns the key switch 9 to "Completion" using the key, and heads to another floor for rescue. The elevator controller 19 excludes this evacuation completion floor 1*c* from the coverage of the shuttle operation of the car 3.

When it is detected in S102 that any one of the hall buttons 11 in the building 1 has been operated, in S103, the elevator controller 19 determines whether or not the hall 8 where the hall button 11 has been operated is the evacuation floor 1*b*, the rescue floors 1*a*, or the evacuation completion floor 1*c*. Hereinafter, the floor where the hall button 11 is operated is referred to as an Xth floor. When the Xth floor is among the rescue floors 1*a* and the evacuation floor 1*b*, in S104, the elevator controller 19 invalidates the hall call registration. On the other hand, when the Xth floor is the evacuation completion floor 1*c*, the elevator controller 19 accepts the hall call registration, and the process proceeds to S105. When the elevator controller 19 accepts the hall call registration here, voice communication is made available between the speaker microphone 10 provided at the hall 8 of the Xth floor hall 8 and the speaker microphone 10 provided at the hall 8 of the evacuation floor 1*b*. This makes it possible for the evacuation guide at the hall 8 of the evacuation floor 1*b* to give evacuation instructions to evacuees at the hall 8 of the evacuation completion floor 1*c*.

Figure 7:
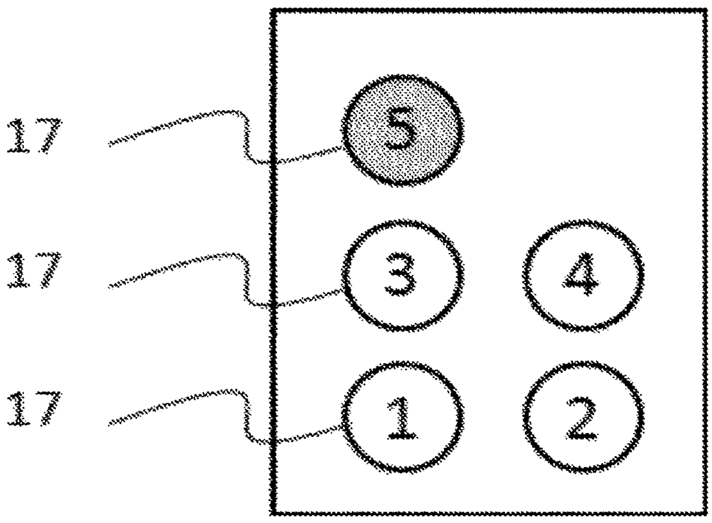
FIG. 7 is a front view of destination floor registration buttons according to Embodiment 1 of the present invention.

In S105, the button indicating the Xth floor among the destination floor registration buttons 17 provided in the car 3 is lit or blinked. FIG. 7 is a front view of the destination floor registration buttons 17 according to Embodiment 1 of the present invention, and illustrates an example in which the button of the fifth floor is lit or blinked. The destination floor registration buttons 17 function as a first notification means to light or blink in order to notify the evacuation guide in the car 3 that an evacuee remains in the Xth floor.

In S106, the elevator controller 19 makes the speaker microphone 10 provided at the hall 8 of the evacuation floor 1*b* notify that an evacuee remains in the Xth floor and the process proceeds to S107. By these operations, the evacuation completion floor 1*c* where evacuees remain can be notified of to the evacuation guide guiding evacuees at the hall 8 of the evacuation floor 1*b*.

In S107, in the car 3, the evacuation guide performs a predetermined operation to the destination floor registration button 17 which is lighting or blinking. The predetermined operation is, for example, to press the button indicating the evacuation floor 1*b* and the lighting or blinking button at the same time, to press the lighting or blinking button a predetermined number of times, or to keep pressing the lighting or blinking button for a predetermined duration. Until this operation is performed, the process keeps returning to S106 to repeat the notification from the speaker microphone 10 provided at the hall 8 of the evacuation floor 1*b*. In S107, when the elevator controller 19 detects that the predetermined operation has been performed to the destination floor registration buttons 17, the process proceeds to S108. In S108, the elevator controller 19 accepts a car call registration which designates the Xth floor as a destination floor.

When the elevator controller 19 accepts the car call registration, the process proceeds to S109.

In S109, the elevator controller 19 makes the car 3 travel to the Xth floor designated by the car call registration. Thus, the evacuation guide rides on the car 3 to head for the evacuation completion floor 1*c* to rescue an evacuee there.

Figure 8:
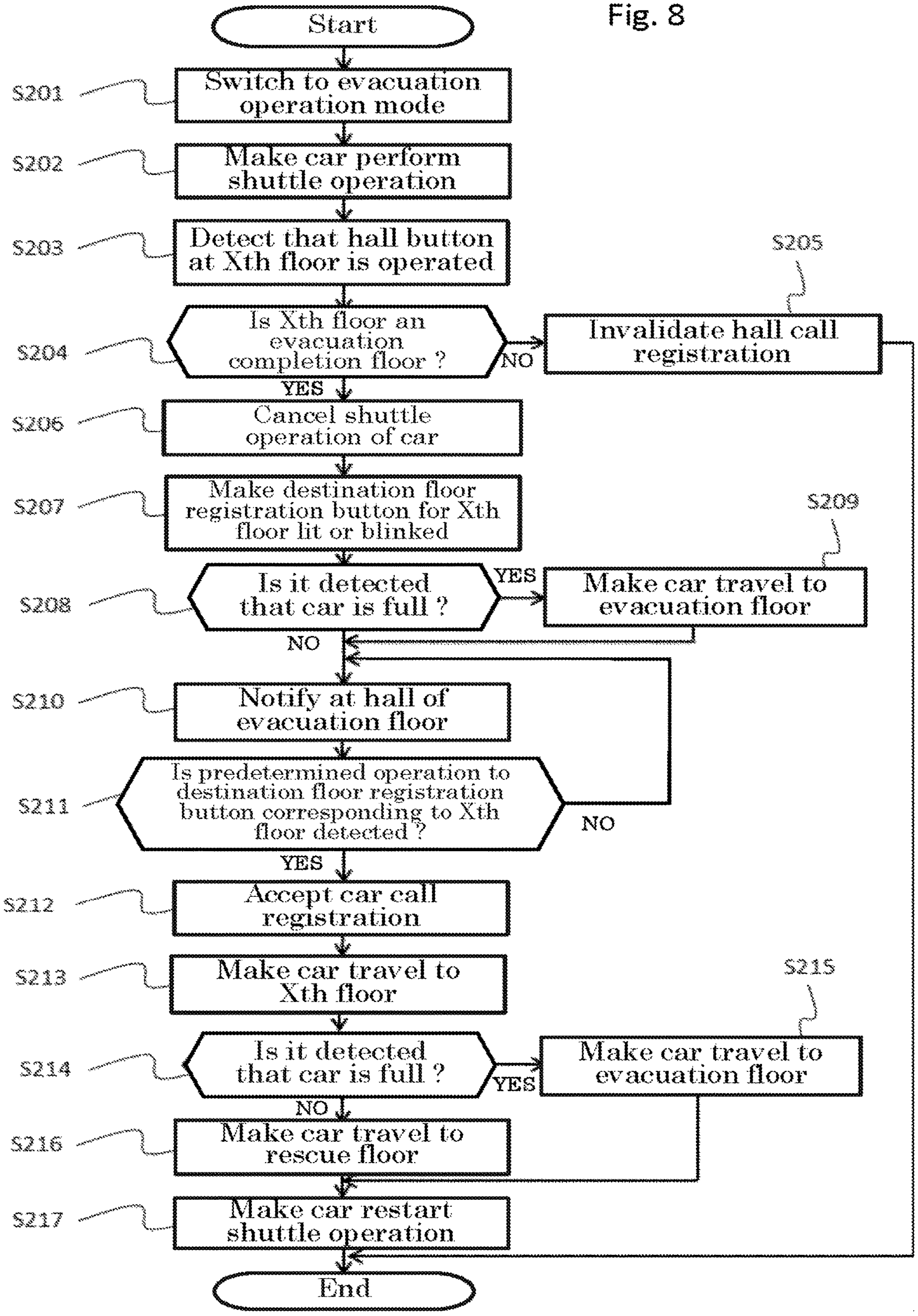
FIG. 8 is a flowchart illustrating how the elevator controller operates when a hall button in the evacuation completion floor is operated while the car is shuttling between a rescue floor and an evacuation floor.

Next, referring to FIG. 8, explanation will be made about the operation of the elevator controller 19 when the hall button 11 in the evacuation completion floor 1*c* is operated while the car 3 is shuttling between the rescue floor 1*a* and the evacuation floor 1*b*. FIG. 8 is a flowchart illustrating how the elevator controller 19 operates when the hall button 11 in the evacuation completion floor 1*c* is operated while the car 3 is shuttling between the rescue floor 1*a* and the evacuation floor 1*b*. In S201, the elevator controller 19 switches from a normal operation to an evacuation operation. In S202, the elevator controller 19 makes the car 3 perform a shuttle operation between the rescue floor 1*a* and the evacuation floor 1*b* to evacuate evacuees remaining in the rescue floor 1*a* to the evacuation floor 1*b*.

When it is detected in S203 that any one of the hall buttons 11 in the building 1 has been operated, in S204, the elevator controller 19 determines whether or not the hall 8 where the hall button 11 has been operated is the evacuation floor 1*b*, the rescue floors 1*a*, or the evacuation completion floor 1*c*. Hereinafter, the floor 8 where the hall button 11 is operated is referred to as an Xth floor. When the Xth floor is any of the evacuation floor 1*b* and the rescue floors 1*a*, the process proceeds to S205 to invalidate a hall call registration made by operating the hall button 11. When the Xth floor is the evacuation completion floor 1*c*, the hall call registration is validated and the process proceeds to S206. When, at this point, the elevator controller 19 accepts the hall call registration, voice communication is made available between the speaker microphone 10 provided at the hall 8 of the Xth floor and the speaker microphone 10 provided at the hall 8 of the evacuation floor 1*b*. As a result, the evacuation guide at the hall 8 of the evacuation floor 1*b* can give evacuation instructions to an evacuee at the hall 8 of the evacuation completion floor 1*c*.

In S206, the elevator controller 19 temporarily cancels the shuttle operation of the car 3. When the shuttle operation of the car 3 is discontinued, the process proceeds to S207.

In S207, the button indicating the Xth floor among the destination floor registration buttons 17 provided in the car 3 is lit or blinked, and the process proceeds to S208. By this operation, the evacuation guide in the car 3 can be notified of the evacuation completion floor 1*c* where the evacuee remains.

In S208, the overcrowding detection device 18 provided in the car 3 determines whether the car 3 is full. In a case where it is determined that the car is full, the process proceeds to S209, so that the evacuees in the car 3 are evacuated to the evacuation floor 1*b*, and then the process proceeds to S210. On the other hand, if the car 3 is not full in S208, the process proceeds to S210.

In S210, it is notified that an evacuee remains in the Xth floor, by the speaker microphone 10 provided at the hall 8 of the evacuation floor 1*b*; and then, the process proceeds to S211. By this operation, the evacuation completion floor 1*c* where the evacuee remains can be notified of to the evacuation guide guiding evacuees at the hall 8 of the evacuation floor 1*b*.

In S211, in the car 3, the evacuation guide performs a predetermined operation to the destination floor registration button 17 which is lighting or blinking. The predetermined operation is, for example, to press the button indicating the evacuation floor 1*b* and the lighting or blinking button at the same time, to press the lighting or blinking button a predetermined number of times, or to keep pressing the lighting or blinking button for a predetermined duration. Until this operation is performed, the process keeps returning to S210 so that the notification will be continued from the speaker microphone 10 provided at the hall 8 of the evacuation floor 1*b*. In S211, when the destination floor registration button 17 has had the predetermined operation performed thereto, the process proceeds to S212. In S212, the elevator controller 19 accepts a car call registration which designates the Xth floor as a destination floor. When the elevator controller 19 accepts the car call registration, the process proceeds to S213.

In S213, the elevator controller 19 makes the car 3 travel to the Xth floor designated by the car call registration. Thus, the evacuation guide can head for the evacuation completion floor 1*c* to rescue an evacuee there, using the elevator. After the evacuee in the evacuation completion floor 1*c* is rescued, the process proceeds to S214.

In S214, the overcrowding detection device 18 determines whether the car 3 is full. In a case when the car 3 is full, the process proceeds to S215, and the car 3 travels to the evacuation floor 1*b* to evacuate evacuees in the car 3 to the evacuation floor 1*b*. Then, the process proceeds to S217 and the shuttle operation of the car 3 is restarted between the rescue floor 1*a* and the evacuation floor 1*b*. On the other hand, if the car 3 is not full in S214, the process proceeds to S216, and the car 3 travels to the rescue floor 1*a*. When the car 3 arrives at the rescue floor 1*a*, the process proceeds to S217, and the shuttle operation of the car 3 is restarted.

It has been explained that when, in S103 and S204, the elevator controller 19 accepts a hall call registration, voice communication is made available between the speaker microphone 10 provided at the hall 8 of the Xth floor and the speaker microphone 10 provided at the hall 8 of the evacuation floor 1*b*. However, it is not limited to this method. For example, there may be a configuration such that voice communication will be made available between the speaker microphone 10 provided at the hall 8 of the Xth floor and the speaker microphones 10 provided at all of the halls 8 of the floors other than the Xth floor. By this configuration, the evacuation guides at the halls 8 other than of the evacuation floor 1*b* can give evacuation instructions to an evacuee at the hall 8 of the evacuation completion floor 1*c*.

It has been explained that, in S106 and S210, the hall 8 where the hall call registration is registered is notified of by the speaker microphone 10 provided at the hall 8 of the evacuation floor 1*b*. However, it is not limited to this method. For example, the notification may be given by the speaker microphones 10 provided at the halls 8 of all of the rescue floors 1*a*. By this notification, the evacuation guide staying at the hall 8 of any one of the rescue floors 1*a* can also head for the evacuation completion floor 1*c* to rescue an evacuee there.

Note that when, in S102 and S203, the hall buttons 11 provided at the halls 8 are pressed at multiple evacuation completion floors 1*c*, the corresponding multiple destination floor registration buttons 17 are lit or blinked in S105 and S207. In this case, in S107 and S211, the evacuation guide can perform a predetermined operation to the multiple destination floor registration buttons 17 which are being lit or blinked. When the predetermined operation is performed to the multiple destination floor registration buttons 17, in S109 and S213 the car 3 sequentially travels to the floors corresponding to the destination floor registration buttons 17 having been operated. Note that the sequence of traveling may be the order in which the destination floor registration buttons 17 are operated, or the order from an upper floor to a lower floor. The order, however, may be a sequence other than these sequences.

As described above, in the elevator system according to this embodiment, an evacuee who arrives late at the hall 8 of an evacuation completion floor 1*c* can request rescue using the hall buttons 11 and can evacuate by the elevator. For example, in a case when an evacuee such as a wheelchair user or elderly person arrives late for evacuation, the evacuee can use the elevator to evacuate to the evacuation floor 1*b*, which will make the rescue operation by the evacuation guide smoother.

An elevator system according to this embodiment includes key switches 9 each provided at a hall 8 and used in an evacuation operation to select either one of a shuttle operation request mode for requesting a car 3 to shuttle between an evacuation floor 1*b* and a rescue floor 1*a*, or an evacuation completion mode for indicating completion of evacuation; a first notification means provided in the car 3; and an elevator controller 19 which is capable of switching between a normal operation and the evacuation operation, the elevator controller 19 determining, in a case when at least one of the key switches 9 is switched to the evacuation operation, that a floor at a hall 8 whose key switch 9 is in the shuttle operation mode is a rescue floor 1*a* and a floor at a hall 8 whose key switch 9 is in the evacuation completion mode is an evacuation completion floor 1*c*, and the elevator controller 19 making, in a case when a hall button 11 provided at the hall 8 of the evacuation completion floor 1*c* is operated, the first notification means notify of the evacuation completion floor 1*c*. This makes it possible, during an evacuation operation, to validate the hall call registration operation from the hall 8 by an evacuee who arrives late at the hall 8 of the evacuation completion floor 1*c* having been excluded by the evacuation guide from the coverage of the shuttle operation mode of the car. In addition, because the evacuation completion floor 1*c* where the evacuee has performed the hall call registration operation is notified of in the car 3, the evacuation guide in the car can recognize the evacuation completion floor 1*c* where the evacuee who failed to escape remains.

The elevator system according to this embodiment includes multiple destination floor registration buttons 17 provided in the car 3, wherein, when a button among the multiple destination floor registration buttons 17, corresponding to the evacuation completion floor 1*c* notified of by the first notification means has a predetermined operation performed thereon, the elevator controller 19 accepts a car call registration to designate the evacuation completion floor 1*c* as a destination floor. Thus, the evacuation guide operates the destination floor registration button 17 corresponding to the evacuation completion floor 1*c* notified of in the car 3, and can head, by using the car 3, for the evacuation completion floor 1*c* where the evacuee remains. Further, because the car call registration cannot be accepted unless the destination floor registration buttons 17 have had a predetermined operation performed thereto, there is no concern that an evacuee in the car 3 accidentally may perform the car call registration.

In the elevator system according to this embodiment, in a case when hall buttons 11 are operated at multiple evacuation completion floors 1*c*, the elevator controller 19 makes the first notification means notify of the multiple evacuation completion floors 1*c*, when the first notification means is indicating the multiple evacuation completion floors 1*c*, and if respective buttons which are among the multiple destination floor registration buttons 17 and correspond to the multiple evacuation completion floors 1*c* have a predetermined operation performed thereon, the elevator controller 19 accepts multiple car call registrations to designate the multiple evacuation completion floors 1*c* as destination floors. Therefore, if there are evacuees arriving late at the halls 8 of multiple evacuation completion floors 1*c*, the evacuation guide operates the respective destination floor registration buttons 17 corresponding to the multiple evacuation completion floors 1*c* notified of in the car 3, so that the evacuation guide can use the car 3 to head, for rescue, for the multiple evacuation completion floors 1*c* where evacuees remain.

In the elevator system according to this embodiment, the destination floor registration buttons 17 are capable of emitting light, and function as the first notification means which, when a hall button 11 is operated at an evacuation completion floor 1*c*, lights or blinks the destination floor registration button corresponding to the evacuation completion floor 1*c*. This makes it possible for the evacuation guide in the car 3 to recognize the evacuation completion floors 1*c* where evacuees having failed to escape remain, from the lighting or blinking buttons of the destination floor registration buttons 17.

In the elevator system according to this embodiment, when the hall button 11 at an evacuation completion floor 1*c* is operated while the car 3 is performing shuttle operation, the elevator controller 19 temporarily cancels the shuttle operation.

This makes it possible that, even while evacuees in the rescue floors 1*a* are being evacuated to the evacuation floor 1*b*, the evacuees arriving late at the halls 8 of the evacuation completion floors 1*c* are rescued.

The elevator system according to this embodiment includes speaker mikes 10 each provided at a hall 8 to notify, when the hall button 11 provided at the hall 8 of an evacuation completion floor 1*c*, is operated, of the evacuation completion floor 1*c*, and when the hall button 11 at an evacuation completion floor 1*c* is operated, voice communication is made available between the speaker mike 10 provided at the evacuation completion floor 1*c* and the speaker mike 10 provided at a floor other than the evacuation completion floor 1*c*. Therefore, because it is notified that there is an evacuee who has arrived late at the hall 8 of the evacuation completion floor 1*c*, by the speaker microphones 10 provided at all the halls 8 except the hall 8 of the evacuation completion floor 1*c*, and also by the destination floor registration button 17 provided in the car 3, the evacuation guide can recognize earlier the hall 8 where the evacuee remains. In addition, the evacuation guide can give evacuation instructions to the evacuee having arrived late at the hall 8 of the evacuation completion floor 1*c*.

Although it has been explained that the key switch 9 is to be operated by turning the evacuation-guide-carrying key with the key inserted therein, it is not limited to this operation. For example, a configuration may be adopted in which, by operating the hall buttons 11 with the evacuation-guide-carrying key inserted in the key switch 9, a mode is selected from among the shuttle operation request mode, the shuttle operation cancellation mode and the evacuation completion mode. Or, another configuration may be adopted.

In addition, a speaker, a monitor, or the like may be provided as the first notification means in the car 3. In this case, when the evacuation guide performs a predetermined operation to the destination floor registration button 17 corresponding to the evacuation completion floor 1*c* notified of by the speaker or the monitor, the elevator controller accepts the car call registration. In addition to providing a speaker, a monitor or the like as the first notification means, the destination floor registration button 17 corresponding to the evacuation completion floor 1*c* may also be lit or blinked when the hall button 11 of the evacuation completion floor 1*c* is operated.

Note that the hall buttons 11 and the destination floor registration buttons 17 may be either a push button type or a touch panel type. Or, another configuration may be adopted.

Embodiment 2

Figure 9:
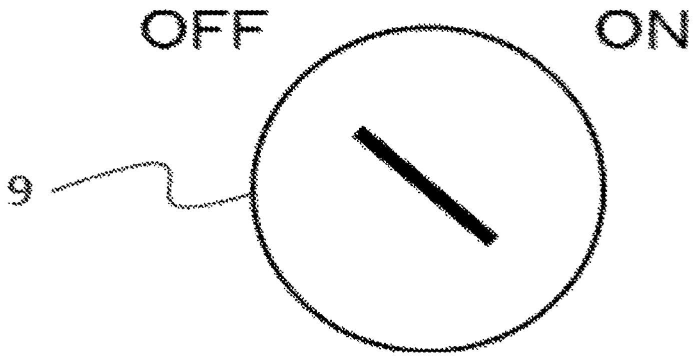
FIG. 9 is a front view of a key switch according to Embodiment 2 of the present invention.

In Embodiment 1, the key switch 9 is described as a three position type, but it may be a two position type. FIG. 9 is a front view of a key switch 9 according to Embodiment 2 of the present invention. Either "ON" indicating a shuttle operation request mode or "OFF" indicating a shuttle operation cancellation mode is selected by turning a key (not illustrated) with the key inserted in the key switch 9. The key switch 9 outputs a control signal corresponding to the selection to an elevator controller 19. When "ON" is selected with the key switch 9, the elevator controller 19 determines that this floor is a rescue floor 1*a*, makes a car 3 shuttle between this rescue floor 1*a* and an evacuation floor 1*b*, and invalidates a hall call registration registered by a press of a hall button 11 provided at this hall 8. When "OFF" is selected with the key switch 9, the elevator controller 19 excludes this floor from the coverage of the shuttle operation of the car 3, and invalidates a hall call registration registered by a press of the hall button 11 provided in this hall 8. The evacuation guide can select an evacuation completion mode by switching to "OFF" after selecting "ON" with the key switch 9. When the evacuation completion mode is selected with the key switch 9, the elevator controller 19 determines that this floor is an evacuation completion floor 1*c*, excludes this floor from the coverage of the shuttle operation of the car 3, and validates a hall call registration registered by a press of the hall button 11 provided in this hall 8. Note that, although the marks on the key switch 9 are "ON" and "OFF", they are not limited to these. For example, they may be "SELECT" and "CANCEL".

The configuration of the elevator system in this embodiment is the same as in Embodiment 1, except the key switch 9. Also, both the operation of the elevator system when the hall button 11 of the evacuation completion floor 1*c* is operated, and the operation of the elevator system when the hall button 11 of the evacuation completion floor 1*c* while the car 3 is shuttling between the rescue floor 1*a* and the evacuation floor 1*b*, are the same as the respective operations explained in Embodiment 1.

As described above, in the elevator system according to this embodiment, similarly to Embodiment 1, an evacuee having arrived late at the hall 8 of the evacuation completion floor 1*c* can evacuate using the elevator by performing a rescue request with the hall buttons 11. For example, in a case when an evacuee such as a wheelchair user or an elderly person has failed to escape, the evacuation guide can head to rescue them.

Although it has been described that the evacuation guide can select an evacuation completion mode by switching to "OFF" after selecting "ON" on the key switch 9, the selection operation is not limited to this. For example, a configuration may be adopted in which the evacuation completion mode can be selected when the key switch 9 is turned to "OFF" after "ON" is selected on the key switch 9 and then a following certain period elapses. This configuration can prevent accidental cancellation of the car shuttle operation, which is caused by erroneously turning the switch to "OFF" after selecting "ON".

Noted that, although it has been described that the key switch 9 is to be operated by turning the evacuation-guide-carrying key inserted therein, the operation is not limited to this. For example, a configuration may be adopted in which, by operating the hall buttons 11 with the evacuation-guide-carrying key inserted in the key switch 9, a mode is selected from among the shuttle operation request mode, the shuttle operation cancellation mode and the evacuation completion mode. Or, another configuration may be adopted.

In addition, a speaker, a monitor, or the like may be provided as the first notification means in the car 3. In this case, when the evacuation guide performs a predetermined operation to the destination floor registration button 17 corresponding to the evacuation completion floor 1*c* notified of by the speaker or the monitor, the elevator controller accepts the car call registration. In addition to providing a speaker, a monitor or the like as the first notification means, the destination floor registration button 17 corresponding to the evacuation completion floor 1*c* may also be lit or blinked when the hall button 11 of the evacuation completion floor 1*c* is operated.

Note that the hall buttons 11 and the destination floor registration buttons 17 may be either a push button type or a touch panel type. Or, another configuration may be adopted.

DESCRIPTION OF SYMBOLS

1: building
1*a*: rescue floor
1*b*: evacuation floor
1*c*: evacuation completion floor
2: hoistway
3: car
4: counterweight
5: rope
6: hoisting machine
7: deflector wheel
8: hall
9: key switch
10: speaker microphone
11: hall button
12: hall door
13: ceiling
14: car wall
15: car floor
16: car door
17: destination floor registration button
18: overcrowding detection device
19: elevator controller
20: driving device
21: emergency detection device

The invention claimed is:

1. An elevator system comprising:

key switches disposed at corresponding rescue floors and used in an evacuation operation to select a shuttle operation request mode for requesting a car to shuttle between an evacuation floor and the corresponding rescue floor, or an evacuation completion mode for indicating completion of evacuation, the evacuation floor being a floor to which people are to exit the car during the evacuation operation, the rescue floors being floors from which people to be evacuated are to enter into the car during the evacuation operation;

hall buttons disposed at corresponding floors, the hall buttons being different from the key switches;

a first notifier in the car; and an elevator controller to switch between a normal operation and the evacuation operation, the elevator controller determining, in a case when at least one of the key switches is switched during the evacuation operation, that a floor at a hall whose key switch is in the shuttle operation request mode is the corresponding rescue floor and a floor at a hall whose key switch is in the evacuation completion mode is an evacuation completion floor, and the elevator controller making, in a case when a hall button at the evacuation completion floor is operated, the first notifier notify that a person is on the evacuation completion floor.

2. The elevator system according to claim 1, further comprising multiple destination floor registration buttons in the car, wherein, when a button among the multiple destination floor registration buttons, corresponding to the evacuation completion floor notified of by the first notifier has a predetermined operation performed thereon, the elevator controller accepts a car call registration to designate the evacuation completion floor as a destination floor.

3. The elevator system according to claim 2, wherein in a case when hall buttons are operated at multiple evacuation completion floors during the evacuation operation, the elevator controller makes the first notifier notify of the multiple evacuation completion floors, when the first notifier is indicating the multiple evacuation completion floors, and if respective buttons which are among the multiple destination floor registration buttons and correspond to the multiple evacuation completion floors have a predetermined operation performed thereon, the elevator controller accepts multiple car call registrations to designate the multiple evacuation completion floors as destination floors.

4. The elevator system according to claim 2, wherein the destination floor registration buttons are capable of emitting light, and function as the first notifier which, when a hall button is operated at an evacuation completion floor, lights or blinks the destination floor registration button corresponding to the evacuation completion floor.

5. The elevator system according to claim 3, wherein the destination floor registration buttons are capable of emitting light, and function as the first notifier which, when a hall button is operated at an evacuation completion floor, lights or blinks the destination floor registration button corresponding to the evacuation completion floor.

6. The elevator system according to claim 1, wherein when the hall button at an evacuation completion floor is operated while the car is performing the shuttle operation, the elevator controller temporarily cancels the shuttle operation.

7. The elevator system according to claim 2, wherein when the hall button at an evacuation completion floor is operated while the car is performing the shuttle operation, the elevator controller temporarily cancels the shuttle operation.

8. The elevator system according to claim 3, wherein when the hall button at an evacuation completion floor is operated while the car is performing the shuttle operation, the elevator controller temporarily cancels the shuttle operation.

9. The elevator system according to claim 4, wherein when the hall button at an evacuation completion floor is operated while the car is performing the shuttle operation, the elevator controller temporarily cancels the shuttle operation.

10. The elevator system according to claim 5, wherein when the hall button at an evacuation completion floor is operated while the car is performing the shuttle operation, the elevator controller temporarily cancels the shuttle operation.

11. The elevator system according to claim 1, further comprising second notifiers disposed at corresponding rescue floors to notify, when the hall button at the evacuation completion floor is operated, of the evacuation completion floor, wherein when the hall button at an evacuation completion floor is operated, voice communication is made available between the second notifier at the evacuation completion floor and the second notifier at a floor other than the evacuation completion floor.

12. The elevator system according to claim 2, further comprising second notifiers disposed at corresponding rescue floors to notify, when the hall button at the evacuation completion floor is operated, of the evacuation completion floor, wherein when the hall button at an evacuation completion floor is operated, voice communication is made available between the second notifier at the evacuation completion floor and the second notifier at a floor other than the evacuation completion floor.

13. The elevator system according to claim 3, further comprising second notifiers disposed at corresponding rescue floors to notify, when the hall button at the evacuation completion floor is operated, of the evacuation completion floor, wherein when the hall button at an evacuation completion floor is operated, voice communication is made available between the second notifier at the evacuation completion floor and the second notifier at a floor other than the evacuation completion floor.

14. The elevator system according to claim 4, further comprising second notifiers disposed at corresponding rescue floors to notify, when the hall button at the evacuation completion floor is operated, of the evacuation completion floor, wherein when the hall button at an evacuation completion floor is operated, voice communication is made available between the second notifier at the evacuation completion floor and the second notifier at a floor other than the evacuation completion floor.

15. The elevator system according to claim 5, further comprising second notifiers disposed at corresponding rescue floors to notify, when the hall button at the evacuation completion floor is operated, of the evacuation completion floor, wherein when the hall button at an evacuation completion floor is operated, voice communication is made available between the second notifier at the evacuation completion floor and the second notifier at a floor other than the evacuation completion floor.

16. The elevator system according to claim 6, further comprising second notifiers disposed at corresponding rescue floors to notify, when the hall button at the evacuation completion floor is operated, of the evacuation completion floor, wherein when the hall button at an evacuation completion floor is operated, voice communication is made available between the second notifier at the evacuation completion floor and the second notifier at a floor other than the evacuation completion floor.

17. The elevator system according to claim 7, further comprising second notifiers disposed at corresponding rescue floors to notify, when the hall button at the evacuation completion floor is operated, of the evacuation completion floor, wherein when the hall button at an evacuation completion floor is operated, voice communication is made available between the second notifier at the evacuation completion floor and the second notifier at a floor other than the evacuation completion floor.

18. The elevator system according to claim 8, further comprising second notifiers disposed at corresponding rescue floors to notify, when the hall button at the evacuation completion floor is operated, of the evacuation completion floor, wherein when the hall button at an evacuation completion floor is operated, voice communication is made available between the second notifier at the evacuation completion floor and the second notifier at a floor other than the evacuation completion floor.

19. The elevator system according to claim 9, further comprising second notifiers disposed at corresponding rescue floors to notify, when the hall button at the evacuation completion floor is operated, of the evacuation completion floor, wherein when the hall button at an evacuation completion floor is operated, voice communication is made available between the second notifier at the evacuation completion floor and the second notifier at a floor other than the evacuation completion floor.

20. The elevator system according to claim 10, further comprising second notifiers disposed at corresponding rescue floors to notify, when the hall button at the evacuation completion floor is operated, of the evacuation completion floor, wherein when the hall button at an evacuation completion floor is operated, voice communication is made available between the second notifier at the evacuation completion floor and the second notifier at a floor other than the evacuation completion floor.

* * * * *